Oct. 1, 1940.   A. KUHNS   2,216,118
SLIP COUPLING DRIVE ASSEMBLY
Filed Dec. 23, 1938   2 Sheets-Sheet 1
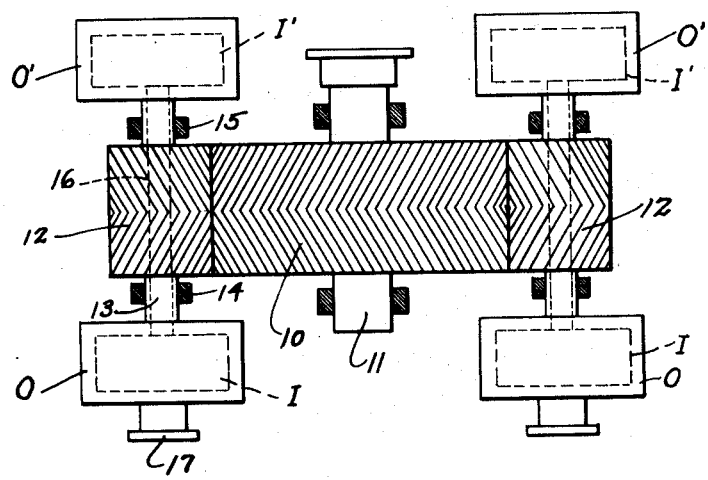
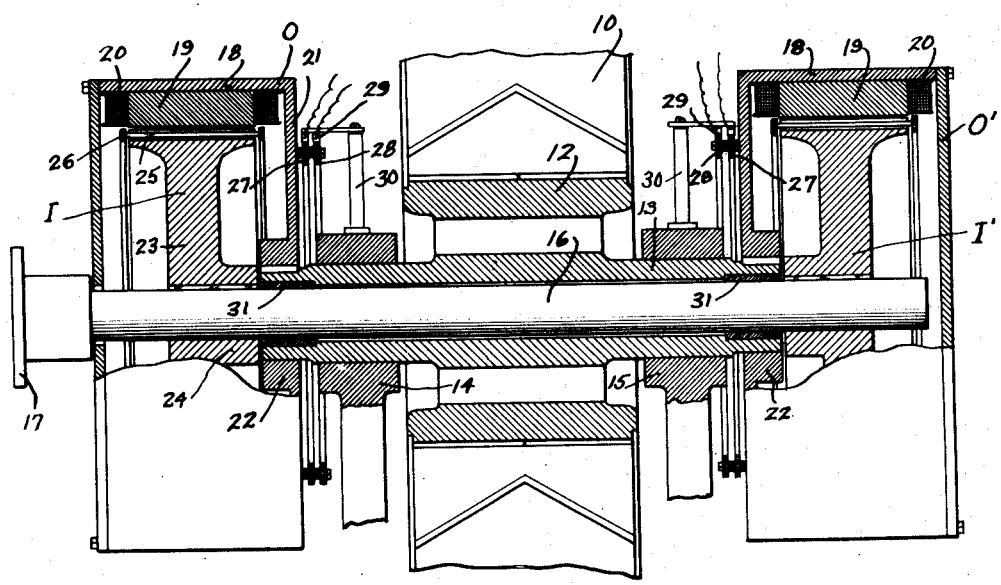
Inventor
Austin Kuhns.

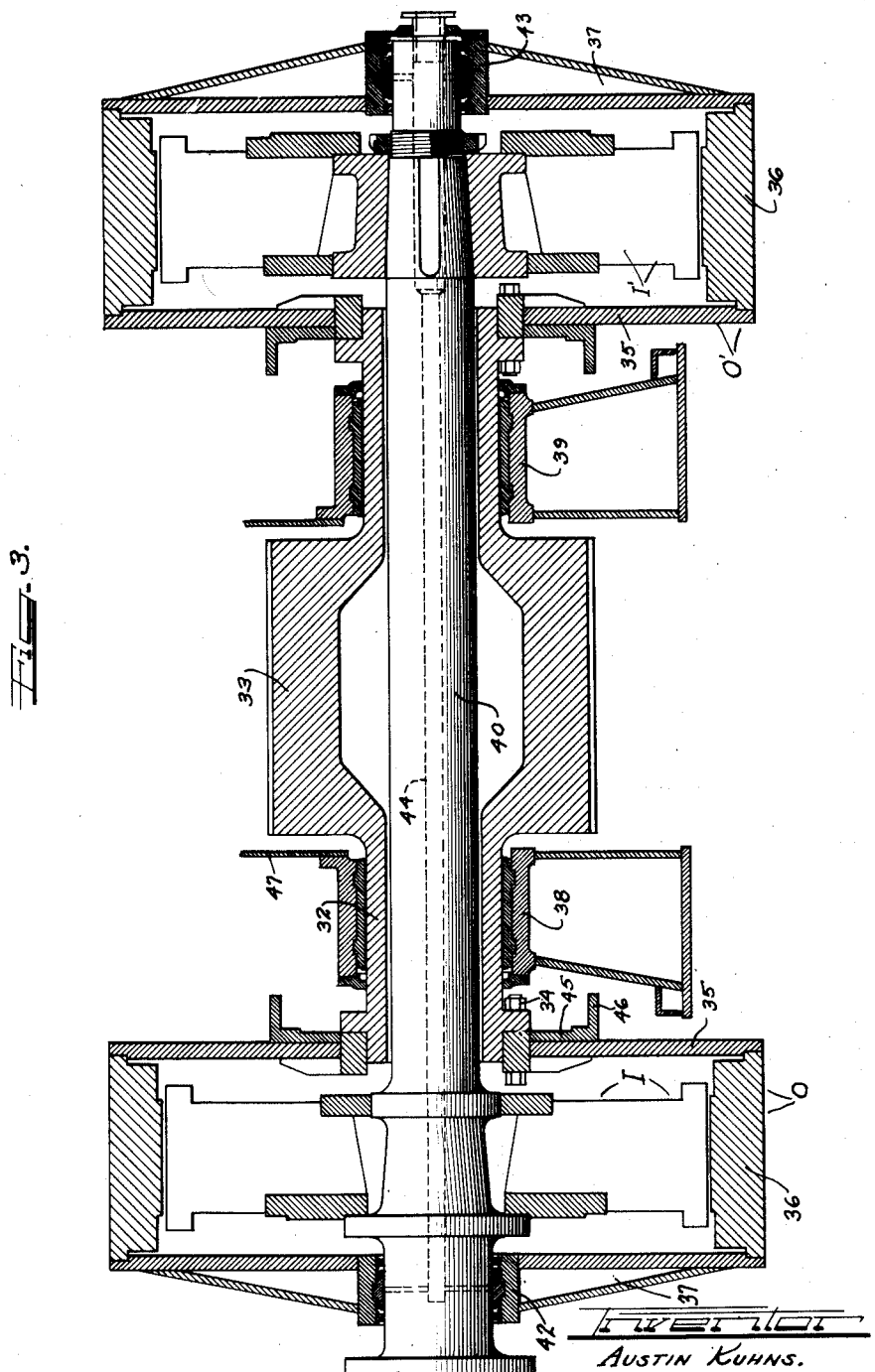

Patented Oct. 1, 1940

2,216,118

UNITED STATES PATENT OFFICE 2,216,118

SLIP COUPLING DRIVE ASSEMBLY

Austin Kuhns, Buffalo, N. Y., assignor to Farrel-Birmingham Company, Incorporated, Buffalo, N. Y., a corporation of Connecticut Application December 23, 1938, Serial No. 247,346

2 Claims. (Cl. 74—410)

This invention relates to slip coupling drive assemblies and is of particular advantage and utility in drive or propulsion systems where the couplings are of the electro-magnetic type, as for example, in marine propulsion drive assemblies.

Propulsion systems of the type referred to usually comprise a driving gear mounted on a propulsion shaft and meshed at its opposite sides by driving pinions, with each pinion shaft journalled in bearings adjacent the sides of the respective pinions and each pinion shaft having at one end the rotor element of a slip coupling whose other element is connected with a power source such as a Diesel engine. With this arrangement, the overhanging weight of the pinion shaft supported element may cause the weight load on the bearings to be unbalanced, and when the driving tooth load is added it will be further unbalanced, and proper and efficient alignment of the pinion and gear teeth will not be maintained.

In accordance with my invention, I provide two slip coupling structures, one at each end of the pinion shaft and in such manner that the weights of the overhung couplings will balance the load on the pinion and shaft while the pinion is at rest or is driving.

The advantages of my improved arrangement are that the alignment between the pinion and the gear teeth can be accurately established and will remain unchanged, and ordinary sleeve bearings or simple anti-friction bearings may be used for supporting the pinion shaft. Furthermore, where two couplings are used as described, the couplings may be of smaller size and of a combined output equal to a single much larger coupling structure at one end of a pinion shaft.

Where the couplings are of the electro-magnetic type, the driving torques of the two couplings may be kept accurately equalized by simple current flow control devices and therefore the pinion shaft will not be subjected to unbalanced torsional strain. With such electro-magnetic couplings, the drive pinion and its shaft with the coupling elements mounted on the ends thereof, may shift freely axially to follow any axial displacement of the propulsion gear engaged by the pinion in order to maintain proper tooth engagement.

Referring to the accompanying drawings,

Figure 1 is a more or less diagrammatic plan view of a propulsion system to which my invention may be advantageously applied; and Figure 2 is an enlarged elevation, partly in section, of one of the pinion and coupling assemblies; and Figure 3 shows a modified arrangement.

Referring to Figure 1, 10 represents the driving gear mounted on a shaft 11 adapted for driving connection with a driving member such as the propeller of a marine craft. The gear is engaged at its opposite sides by pinions 12, and the gear and pinions may be of the double helical or herringbone type. Each pinion shaft 13 is mounted in bearings 14 and 15 and supports at its outer end the outer elements O and O' respectively of electro-magnetic couplings whose inner members I and I' are mounted and keyed on a torque shaft 16 extending through the pinion shaft and at one end being provided with coupling means 17 for coupling thereto of a driving source, as for example, a Diesel engine (not shown). The torque shaft is shown journaled by bearing bushings 31 provided in the ends of the pinion shaft.

The coupling structure shown is of the electro-magnetic type of any suitable construction. In the structure shown on Figure 2, the outer or field element comprises the ring 18 supporting the poles 19 on which the field or excitation windings or coils 20 are mounted. The supporting frames or disks 21 for the pole rings 18 terminate in hubs 22 to which the ends of the pinion shaft 13 are secured.

The inner or armature elements I of the couplings are shown as of the squirrel cage type and comprise the cores or frames 23 mounted on hubs 24, which hubs are keyed to the respective ends of the torque shaft 16 which extends through the tubular pinion shaft. The core has transverse slots around its peripheral portion for receiving the copper bars 25 which at their ends are electrically connected together by rings 26 to form the squirrel cage winding.

The current supply for excitation of the field coils is provided by means of slip rings 27 and 28 which may be mounted on the walls 21 of the field elements for engagement by brushes 29 which may be supported from brackets 30 mounted on the bearings 14 and 15.

The operation of the slip couplings is well understood in the art. The exciting circuit is connected by the brushes with the slip rings forming terminals of the circuit including the field coils, the excitation of the coils creating a magnetic field, and when the inner armature element is rotated, alternating current flow is induced in the squirrel cage winding which produces resistance to relative movement of the coupling elements and thus transmission is effected, the torque delivered being fixed by the amount of slip between the coupling elements. The torque can also be controlled by regulation of the exciting current flow.

In the modified arrangement shown on Figure 3, the tubular shaft 32 for the pinion 33 is secured as by bolts 34 to the inner walls 35 of the outer coupling elements O and O', the pole rings 36 being secured between the inner walls 35 and the outer wall structures 37.

The pinion shaft 32 is journaled in the bearing structures 38 and 39 adjacent to the pinion, and the torque shaft 40 extends through the tubular pinion shaft and through the outer coupling elements O and O', the inner coupling elements I and I' being mounted on and rigidly secured to the torque shaft by keying or otherwise, the torque shaft at one end having the flange 41 by which it may be coupled to a driving source such as a Diesel engine.

Instead of journaling the torque shaft in bushings provided in the pinion shaft, as in the arrangement on Figure 2, bearing structures 42 and 43 supported by the outer wall structures 37 of the outer coupling elements are provided. These bearings may be readily lubricated by lubricant fed into the bore or duct 44 provided in the torque shaft.

In the arrangement of Figure 3, plates 45 are shown clamped or otherwise secured to the inner walls 35 of the outer coupling members, and these plates provide annular flanges 46 for supporting slip rings (not shown), while brackets or walls 47 on the bearing structures 38 and 39 may serve to support the brushes (not shown) connected with the exciting current circuit for the field coils on the pole rings 36.

In the arrangements shown, the two coupling members for each pinion drive are of substantially the same size and weight so that the over hanging weights at the ends of the pinion shaft are equal and the static load is substantially equally applied to the pinion shaft bearings, and the teeth on the pinion will then be in perfect alignment with the teeth on the driven gear. During driving operation, and as the load is applied, the alignment between the pinion and gear teeth will remain unchanged and the pinion shaft bearings will equally support the weight load and the added tooth load. This equalized and balanced operation resulting from the use of two couplings makes it possible to use ordinary sleeve bearings or simple anti-friction bearings for the pinion shaft. The arrangement is also such that the pinion shaft with the coupling field elements mounted thereon may shift axially in the bearings and relative to the torque shaft so that the pinion may follow any axial displacement of the driven gear and maintain proper tooth engagement therewith. By proper regulation of the exciting current flow for the two couplings, their driving torques on the pinion shaft will be such that the torsional strain on the pinion shaft will be uniformly distributed.

I have shown and described practical and efficient embodiments of my invention but I do not desire to be limited to the exact structure and arrangement shown and described, as changes and modifications may be made without departing from the scope of the invention.

I claim as follows:

1. In combination, a gear having a shaft connected thereto for connection to a propeller or the like, a first pair of longitudinally spaced sleeve bearings, an elongated hollow shaft journaled in said first bearings, a pinion secured on said hollow shaft and disposed between said bearings and engaging said gear, a second pair of longitudinally spaced sleeve bearings in said hollow shaft, a driving shaft adapted for direct connection to a prime mover, disposed journaled in said second bearings, a pair of squirrel cage structures mounted secured on said driving shaft, one at each end of said shaft and outwardly of the ends of said hollow shaft, and a pair of magnetic field structures mounted secured on said hollow shaft, one at each end of said hollow shaft, and in opposed spaced relation to and magnetically coupled to said squirrel cage structures.

2. In combination, a first pair of longitudinally spaced bearings, an elongated hollow shaft journaled in said first bearings, a pinion secured on said hollow shaft and disposed between said bearings, a second pair of longitudinally spaced bearings in said hollow shaft, a driving shaft adapted for direct connection to a prime mover, said driving shaft being carried by said hollow shaft and journaled in said second bearings, and having an overhanging end portion at each end of said hollow shaft, a first pair of magnetic coupling elements on said driving shaft, one on each overhung end portion thereof, a second pair of magnetic coupling elements on said hollow shaft, one at each end thereof and in spaced opposed and magnetically coupled relation to said first coupling elements, and a gear having a shaft connected thereto for connection to a propeller or the like arranged engaging said pinion.

AUSTIN KUHNS.